US006487338B2

United States Patent
Asawa et al.

(10) Patent No.: US 6,487,338 B2
(45) Date of Patent: Nov. 26, 2002

(54) PROFILE MATCHING FIBER PATCHCORD FOR FUNDAMENTAL MODE EXCITATION IN GRADED-INDEX MULTIMODE FIBER

(76) Inventors: Charles K. Asawa, 16766 Bollinger Dr., Pacific Palisades, CA (US) 90272-3218; Jane K. Asawa, 16766 Bollinger Dr., Pacific Palisades, CA (US) 90272-3218; Mike H. Asawa, 16766 Bollinger Dr., Pacific Palisades, CA (US) 90272-3218

(*) Notice: Subject to any disclaimer, the term of this patent is extended or adjusted under 35 U.S.C. 154(b) by 112 days.

(21) Appl. No.: 09/801,555

(22) Filed: Mar. 7, 2001

(65) Prior Publication Data

US 2002/0126954 A1 Sep. 12, 2002

(51) Int. Cl.[7] ............................... G02B 6/26; G02B 6/38
(52) U.S. Cl. .......................... 385/29; 385/124; 385/126; 385/127
(58) Field of Search .............................. 385/25, 27, 28, 385/29, 31, 37, 49, 50, 38, 123, 129, 127, 128

(56) References Cited

U.S. PATENT DOCUMENTS

| 4,723,828 | A | * | 2/1988 | Garel-Jones et al. .......... 385/29 |
| 5,077,815 | A | * | 12/1991 | Yoshizawa et al. ............ 385/28 |
| 5,416,862 | A | * | 5/1995 | Haas et al. ..................... 385/28 |
| 5,712,937 | A | * | 1/1998 | Asawa et al. .................. 385/49 |
| 6,044,188 | A | * | 3/2000 | Kropp ........................... 385/33 |
| 6,064,786 | A | * | 5/2000 | Cunningham et al. ......... 385/38 |
| 6,185,346 | B1 | * | 2/2001 | Asawa et al. .................. 385/28 |

* cited by examiner

Primary Examiner—Robert H. Kim
Assistant Examiner—Michael H Caley

(57) ABSTRACT

This invention relates to optical fiber systems where light is launched into and propagated in the fundamental mode of graded-index multimode fiber. Generally, it is not possible to launch light exclusively into the fundamental mode of graded-index multimode fiber by butt-coupling the multimode fiber to an arbitrary fiber carrying light from a source; several other modes may be launched. By inserting a length of a special singlemode fiber between an arbitrary fiber carrying light from a source and the graded-index multimode fiber, light can be launched exclusively into the fundamental mode of the graded-index multimode fiber. The special singlemode fiber has a modal pattern that matches the fundamental Gaussian modal pattern of the graded-index multimode fiber, which permits launching of the light into only the fundamental mode of the multimode fiber. Several applications for propagation in the fundamental mode of graded-index multimode fiber arises. These include: fiber optic sensor systems, high data rate communication links, low modal noise links, high security links, etc.

18 Claims, 3 Drawing Sheets

PROFILE MATCHING FIBER PATCHCORD FOR FUNDAMENTAL MODE EXCITATION IN GRADED-INDEX MULTIMODE FIBER

BACKGROUND OF THE INVENTION

1. Field of Invention

This invention relates to optical fiber systems where light is launched into and propagated in the fundamental mode of graded-index multimode fiber.

Several applications for propagation in the fundamental mode of graded-index multimode fiber arises. These include: fiber optic sensor systems, high data rate communication links, low modal noise links, high security links, etc.

2. Purpose

Launching of light exclusively into the fundamental mode of a graded-index multimode fiber is accomplished with this invention. By inserting a length of a special singlemode fiber between an arbitrary fiber carrying light from a source and the graded-index multimode fiber, the light initially in the arbitrary fiber can be launched exclusively into the fundamental mode of the graded-index multimode fiber. The special singlemode fiber has a modal pattern that matches the fundamental Gaussian modal pattern of the graded-index multimode fiber, which permits launching of the light into only the fundamental mode of the multimode fiber.

3. Prior Art

Several studies of selective excitation of low-order modes of graded-index multimode fiber have been made for various applications. Excitation of one specific mode by use of an optical mask and a shifted grating technique has been demonstrated by F. DuBois, Ph. Emplit, and O. Hugon, "Selective mode excitation in graded-index multimode fiber by a computer generated optical mask," Optics Letters 19, pp. 433–435, 1994.

A theoretical study for reducing modal noise by focusing laser light for spot excitation of low-order modes in graded-index multimode fiber is described by J. Saijonmaa and S. J. Halme, "Reduction of modal noise by using reduced spot excitation", Applied Optics 20, pp. 4302–4305, 1981. The number and description of modes excited in parabolic-index multimode fiber as a function of the spot radius of the input Gaussian beam and the spot radius of the Gaussian fundamental mode of the multimode fiber were calculated. The light beam from a laser was focused onto the multimode fiber core with a lens.

Light from an arbitrary singlemode fiber has been used by some investigators to launch light into the lowest-order modes of graded-index multimode fiber for special applications:

Bandwidth-distance product has been reported to be doubled by J. Haas and M. A. Santoro, "A mode filtering scheme for improvement of the bandwidth-distance product in multimode fiber systems", J. Lightwave Technology 11, pp. 1125–1130, 1993. As the title of the publication suggests, the authors used an arbitrary singlemode fiber to launch low-order modes into graded-index multimode fiber and also used a singlemode fiber segment as a mode filter before detection at the multimode fiber terminal. However, the filter evidently gave rise to serious extraneous noise; the authors noted that movement or twisting of the multimode fiber caused serious problems, requiring the fiber to remain stationary. This requirement makes this system inapplicable for field installation.

A study by C. K. Asawa and H. F. Taylor, "Propagation of light trapped within a set of lowest-order modes of graded-index multimode fiber undergoing bending", Applied Optics 39, pp. 2029–2037, 2000, noted that the problem observed by Haas and Santoro arises from using an arbitrary singlemode fiber for launching the light. Besides launching light into the fundamental mode, other low-order modes are launched. Then, slight movement or twisting of various portions of the fiber causes relative phase shifts between the light in the different launched modes, resulting in differing modal patterns along the fiber. When the output is filtered with the arbitrary singlemode fiber prior to detection in the Haas' and Santoro's system, the varying modal patterns due to the fiber movement and the filtering would introduce serious noise problems. Deployed fiber cables buffeted by environmental conditions would make such a system very difficult to use.

Reduction of modal noise by restricting excitation to the lowest-order modes of graded-index multimode fiber has also been studied experimentally, in which He-Ne laser light is injected into an arbitrary singlemode fiber and then launched into a multimode fiber. This was reported by G. C. Papen and G. M. Murphy, "Modal noise in multimode fibers under restricted launch conditions", J. Lightwave Technology 17, pp. 817–823, 1999. No mode profile-matching study was reported.

A graded-index multimode fiber microbend sensor was studied by D. Donlagic and M. Zavrsnik, "Fiber-optic microbend sensor structure", Optics Letters 22, 837–839, 1997. The authors used an arbitrary singlemode fiber to launch light into a very short length of graded-index multimode fiber which was part of the microbend sensor. The authors also required a singlemode fiber to filter the light after the sensor for their detection system. The modes excited in the multimode fiber were not analyzed in the paper.

A U.S. Pat. No. 6,185,346, Feb. 6, 2001, inventors C. K. Asawa, Jane K. Asawa, and Mike H. Asawa, entitled "Propagation in lowest order modes of multimode graded-index fiber, resulting in very low transmission loss, low modal noise, high data security, and high data rate capabilities", describes launching into the fundamental mode in claim 2: "wherein mode profile of said singlemode waveguide is designed to closely match mode profile of said fundamental propagation mode", and again in claim 11. This present invention is different from the above patent claims: in this present invention a length of special singlemode fiber is inserted between the arbitrary singlemode fiber and the graded-index multimode fiber, in order to provide profile-matching of the mode of the special singlemode fiber and the fundamental mode of the graded-index multimode fiber, so that only the fundamental mode is excited in the graded-index multimode fiber.

SUMMARY: OBJECTS AND ADVANTAGES OF OUR INVENTION (1) Our invention refers to the insertion of a length of special singlemode fiber between an arbitrary singlemode fiber propagating light from a source and the graded-index multimode fiber, where the mode profile of the special singlemode fiber matches the fundamental mode profile of the graded-index multimode fiber. The special fiber, therefore, performs the function of launching the light from the source exclusively into said fundamental mode. The length of special fiber may be in the convenient form of a fiber patchcord, or other means indicated in the claims.

(2) If the arbitrary fiber were used to launch the light into the multimode fiber, there would be no assurance that the light would be launched into only the fundamental mode. More likely, the modes launched into the graded-index multimode fiber will be a set of lowest order mode, including the fundamental mode. This can lead to noisy or unusable measurements in some applications, such as experienced by investigators cited above. The cited investigators evidently did not use the powerful diagnostic tool of the "near-field imaging", as we have, to determine the modes launched into the graded-index multimode fiber, the spot size of the fundamental mode, and the spot size of the of the singlemode fiber.

(3) The theoretical study of Saijonmaa and Halme, cited above, clearly shows that mismatch of the mode profiles of the singlemode fiber with the fundamental mode of a parabolic-index multimode fiber will launch the light into additional mode besides the fundamental mode of the multimode fiber. Hermite-Gaussian modes were the basis wave functions for the modes of a parabolic-index multimode fiber. If the profiles do not match, precise amounts of additional modes launched can be calculated. Their theoretical expression shows that, if the profiles match, light is launched into only the Gaussian fundamental mode of the multimode fiber. Our calculations, which we performed independently, show the same results.

DESCRIPTION OF THE PREFERRED EMBODIMENTS

Figure 1:
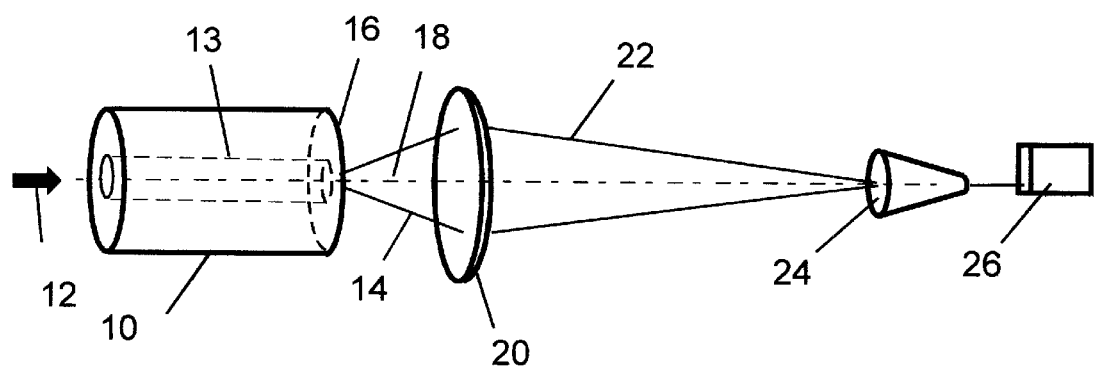
FIG. 1 illustrates the near-field method for determining the modal interference patterns of the light at the fiber output, as detected by an infrared vidicon or CCD array. A lens focuses the output end of a fiber onto the face of the vidicon or CCD array of an infrared video camera. The lens may be a microscope objective. A computer records selected video frames.
Figure 2:
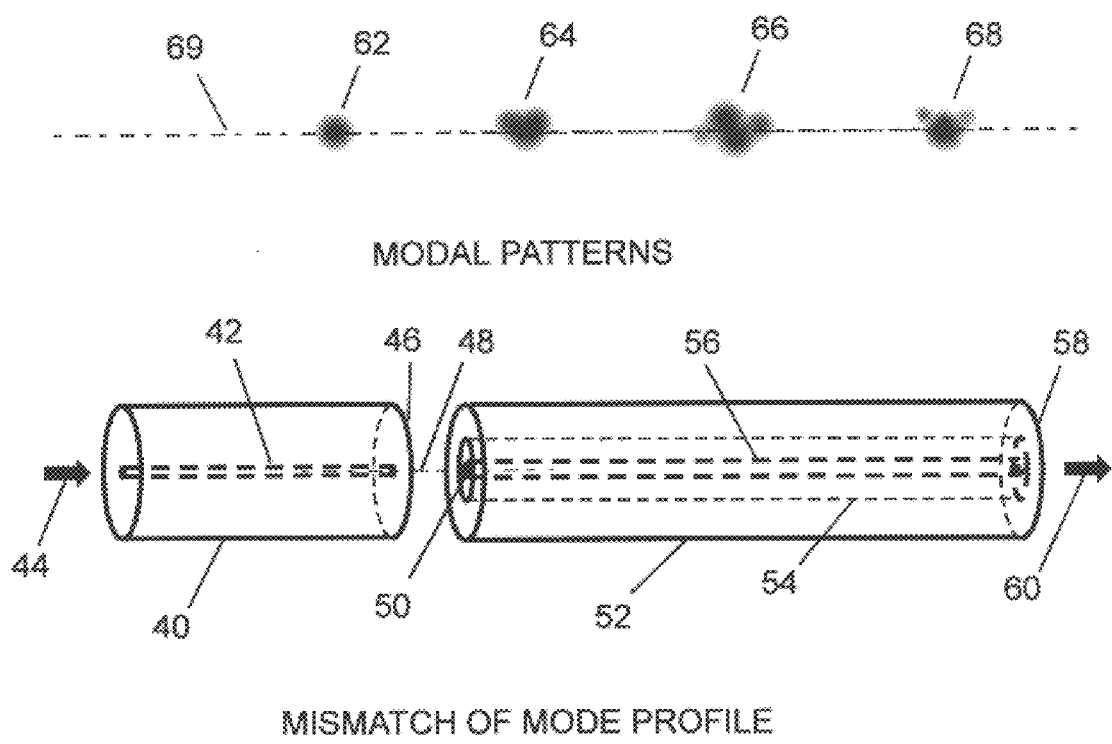
FIG. 2 illustrates the behavior of the light modal patterns in graded-index multimode fiber when there is a modal-profile mismatch of the arbitrary singlemode fiber with that of the fundamental mode profile of a graded-index multimode fiber. The mismatch results in launching the light into additional low order modes, besides the fundamental mode. The different "modal patterns" illustrate that gradual bending or twisting of the multimode fiber along its length will result in phase shifts between the light modes launched, resulting in modal interference pattern changes along the fiber. We have observed many patterns, such as illustrated, at the end of a graded-index multimode fiber as we looped and twisted the fiber near its end.

The near-field diagnostic method for observing the modal interference pattern of light at the end of a fiber is illustrated in FIG. 1. The problem encountered of launching additional modes besides the fundamental mode when an arbitrary singlemode fiber carries the light to the graded-index multimode fiber is illustrated in FIG. 2. Finally, in FIG. 3, we illustrate a preferred embodiment of our invention, where a length of special fiber is inserted between the mismatched fibers of FIG. 2.

FIG. 1 illustrates the near-field diagnostic method for determining typical modal pattern in a fiber 10. Light 12 is launched into core 13 of fiber 10. At output end 16 core 13 is focused by a microscope objective 20 onto the face 24 of an infrared vidicon or CCD array. The near-field light output of fiber 10 is thus imaged on detector face 24. Computer 26 displays the image and grabs a selected frame for recording and printout.

FIG. 2 illustrates the mismatch of the mode profiles of an arbitrary singlemode fiber with that of the fundamental mode of a graded-index multimode fiber, resulting in the launch of additional modes besides the fundamental mode. Light 44 is launched into the core 42 of the arbitrary fiber 40. The spot diameter 62 of the light in the bound mode of fiber 40 is smaller than the spot diameter of the fundamental mode of the graded-index multimode fiber 52. The depicted near-field images 62, 64, 66, and 68 are magnified relative to the drawings of the fiber below them. The output face 46 of fiber 40 and the input face 50 of graded-index multimode fiber 52 are butt-coupled coaxially so that the light 44 in fiber 40 is launched into the core 54 of fiber 52. Since there is a profile mismatch, the radial extent 56 of additional modes launched is greater than that of the fundamental mode of fiber 52. The profile-mismatch can be noted by first taking the near field image at the output of the singlemode fiber 40 and comparing its spot diameter 62 with a calculated spot diameter of the fundamental mode. The spot diameter of the fundamental mode of the graded-index multimode fiber can also be determined experimentally by near-field diagnostic when only the fundamental mode is launched in a separate experiment where profile-matching occurs.

When fiber 52 is disturbed by twisting and looping along its length in FIG. 2, various near-field images at the end of fiber 52 are observed, such as indicated by 64, 66, and 68. The axes of fiber 52 and fiber 40 are collinear and indicated by line 48, since the fibers are aligned coaxially. Line 69 refers to the axes of fibers 40 and 52. For the various disturbances along fiber 52, we can deduce that the modal field patterns, 64, 66, and 68, along the fiber are typically as indicated in FIG. 2. With additional modes launched, the fiber disturbances along the fiber changes the phase of each mode differently, resulting in the interference patterns indicated by 64, 66, and 68. These near-field patterns are observable at the end of the multimode fiber when there is a mode-profile mismatch of the launched wave.

To summarize the description of FIG. 2, when the mode profile of the arbitrary singlemode fiber does not match that of the fundamental mode, a few other low-order modes are launched besides the fundamental mode are launched into graded-index multimode fiber, resulting in varying modal interference pattern along the fiber. This behavior will affect the many applications cited previously.

Figure 3:
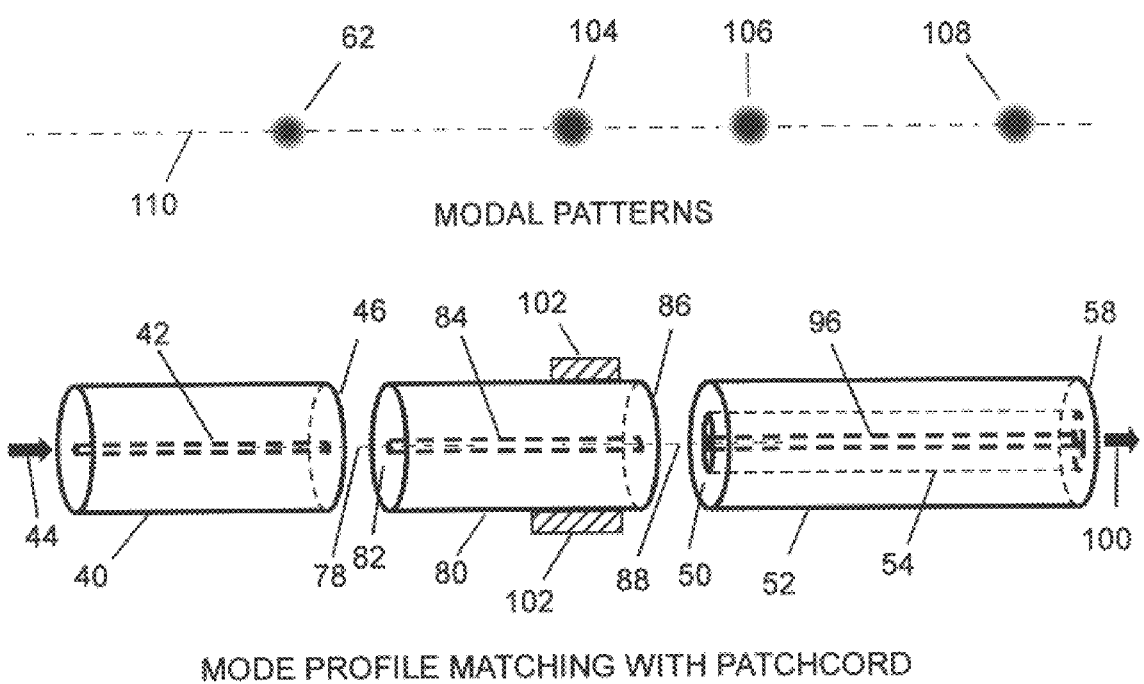
FIG. 3 shows a length of a special singlemode fiber inserted between the arbitrary singlemode fiber and the graded-index multimode fiber of FIG. 2. The special singlemode fiber is fabricated so that its mode profile matches that of the fundamental mode of the graded-index multimode fiber, as illustrated by the modal patterns spots at the top of the figure. The spot diameter of the mode profile of the arbitrary singlemode fiber is noted to be smaller than the spot diameter of the special singlemode fiber. The spot diameter of the special singlemode fiber is selected to match that of the fundamental mode of the graded-index multimode fiber. Since no other mode is launched into the multimode fiber besides the fundamental mode, gradual bending or twisting of the multimode fiber does not affect the fundamental mode pattern along the fiber. A spot diameter is defined to be the diameter between the $1/e^2$ points of the Gaussian mode intensity profile. Any light launched into cladding modes in the special fiber can be stripped out by the coating on the cladding surface.

In FIG. 3 a method for launching light exclusively into the fundamental mode is illustrated. A length of a special singlemode fiber 80 is inserted between the arbitrary singlemode fiber 40 and the graded-index multimode fiber 52 of FIG. 2, also shown in FIG. 3. The purpose of the special singlemode fiber is to have its mode profile match the fundamental mode profile of the graded-index fiber. The light in the bound single mode of fiber 80 then launches the light only into the fundamental mode of fiber 52.

The output face 46 of fiber 40 is butt-coupled coaxially with the input face 82 of the special fiber 80. Line 78 indicates the coaxial line. Light 44 launched into the core 42 of fiber 40 is transported into core 84 of fiber 80. Light 44 is transitioned into the bound single mode of fiber 80. Any spurious cladding modes launched into fiber 80 is stripped out by the coating 102 on the surface of fiber 80, as described below. The output face 86 of fiber 80 is butt-coupled coaxially to the input face 50 of fiber 52. Line 88 indicates the coaxial line. Coaxial butt-coupling fiber 40 to fiber 80 and fiber 80 to fiber 52 may be performed with any combination of fiber connectors, fiber mechanical splices, and fiber fusion splices. When a length of special fiber is attached with fiber connectors at both ends, the length of fiber is commonly called "a patchcord".

The profile mismatch indicated in FIG. 2 is corrected in FIG. 3 by the insertion of fiber 80, where the core 84 of fiber 80 is selected so that the mode spot 104 at the output face 86 of fiber 80 matches the fundamental mode spot 106 of fiber 52. Therefore, since only the fundamental mode is launched into multimode fiber 52, the mode pattern 108 further along fiber 52 remain unchanged, despite gradual looping and twisting disturbances along fiber 52. In order to strip out any light launched into cladding modes of fiber 80, the cladding is coated with a coating 102. Cladding modes reaching the cladding outer surface of fiber 80 are transported to the cladding 102 and radiated out or absorbed. This prevents the launching of light in cladding modes in fiber 80 into bound modes of graded-index multimode fiber 52. Most domestic fibers have cladding coating which will strip cladding modes.

The mode profile of singlemode fiber is determined by the "V-number". The V-number is a function of the wavelength of light, the fiber core radius, and the numerical aperture of the fiber. In order to support only a single bound mode, the V-number must be less than 2.4. A V-number for a singlemode fiber should be between 2.0 and 2.4 for a tightly bound mode. However, if the V-number is less, the mode profile diameter will increase, which may be desirable; however, the mode will be less tightly bound, more readily lost by fiber perturbations. The size of the bound-mode profile is governed by the core radius and the numerical aperture, for a fixed wavelength of light. Therefore, to match the profile of the fundamental mode of the graded-index multimode fiber, the core radius and numerical aperture of the special singlemode fiber can be adjusted.

To summarize the description of FIG. 3: In order to correct the profile mismatch illustrated in FIG. 2, a length of special fiber is inserted between the mismatched fibers. The special fiber has a mode profile that matches the fundamental mode profile of the graded-index multimode fiber, whereby the special fiber launches light into only the fundamental mode of the multimode fiber. Propagation of light in only the fundamental mode of graded-index multimode fiber has many interesting applications, such as cited above.

The above preferred embodiment illustrates that the first fiber propagating light from a source is an arbitrary singlemode fiber. However, the insertion of a length of special singlemode fiber between an arbitarary multimode fiber propagating light and the graded-index multimode fiber will also perform the function of launching the light into only the fundamental mode of the graded-index multimode fiber. However, in this case there will be a loss of light and possibly introduction of noise.

It will be appreciated that, although specific embodiments of the invention have been described in detail for purposes of illustration, various modifications may be made without departing from the spirit and scope of the invention. Accordingly, the invention is not to be limited except as by the appended claims.

We claim:

1. A fiber optic system, comprising:
   a light source, emitting light into a first singlemode fiber;
   a graded-index multimode fiber;
   a length of a second singlemode fiber whose transmission mode profile specially selected to closely match the fundamental mode profile of said graded-index multimode fiber;
   cladding of said second singlemode fiber coated with a coating for stripping light in cladding modes of said second singlemode fiber;
   output end of said first singlemode fiber attached coaxially to the input end of said second singlemode fiber by butt-coupling means, launching said light into said second singlemode fiber;
   output end of said second singlemode fiber attached coaxially with the input end of said graded-index multimode fiber by butt-coupling means, for launching said data light into said graded-index multimode fiber;
   wherein profile-matching of said transmission mode of said second singlemode fiber with said fundamental mode of said graded-index multimode fiber permits said light in said second singlemode fiber to be launched exclusively into said fundamental mode of said graded-index multimode fiber.

2. Said fiber optic communication link of claim 1:
   wherein said light source is a laser diode.

3. Said fiber optic communication link of claim 1:
   wherein said butt-couplings means are selected combinations from a plurality of connector pairs, mechanical splices, and fusion splices.

4. Said fiber optic communication link of claim 3:
   wherein said butt-coupling means are said connector pairs;
   wherein said output end of said first singlemode fiber is attached to said input end of said second singlemode fiber with said connector pair;
   said output end of said second singlemode fiber is attached to said input end of said graded-index multimode fiber with said connector pair;
   said length of said second singlemode fiber, with one-half of said mating connector at said input end and at said output end, commonly denoted as a fiber patchcord.

5. Said fiber optic communication link of claim 3;
   wherein said butt-coupling means are said mechanical splices;
   wherein said output end of said first singlemode fiber is attached to said input end of said second singlemode fiber with said mechanical splice;
   said output end of said second singlemode fiber is attached to said input end of said graded-index multimode fiber with said mechanical splice.

6. Said fiber optic communication link of claim 3:
   wherein said butt-coupling means are said fusion splices;
   wherein said output end of said first singlemode fiber is attached to said input end of said second singlemode fiber with said fusion splice;
   said output end of said second singlemode fiber is attached to said input end of said graded-index multimode fiber with said fusion splice.

7. Said fiber optic communication link of claim 1:
wherein said light source is a light emitting diode.

8. Said fiber optic communication link of claim 1:
wherein said light source is a vertical cavity surface-emitting laser diode.

9. Said fiber optic communication link of claim 1:
wherein said graded-index multimode fiber is a parabolic-index multimode fiber.

10. A fiber optic communication system, comprising:
a light source, emitting light into a first graded-index multimode fiber;
a second graded-index multimode fiber for transmitting said light;
a length of a singlemode fiber whose transmission mode profile closely matching the fundamental mode profile of said second graded-index multimode fiber;
output end of said first graded-index multimode fiber attached coaxially to the input end of said singlemode fiber by butt-coupling means, launching said light into said singlemode fiber;
said singlemode fiber cladding coated with coating for stripping light in cladding modes of said singlemode fiber;
wherein a portion of the original power of the said light in said first graded-index multimode fiber is propagated in the bound singlemode to the output end of said singlemode fiber;
said output end of said singlemode fiber attached coaxially with input end of said second graded-index multimode fiber by butt-coupling means;
wherein profile-matching of said transmission mode profile of said singlemode fiber with said fundamental mode profile of said second graded-index multimode fiber permits said light in said output end of said singlemode fiber to be launched exclusively into said fundamental mode of said second graded-index multimode fiber.

11. Said fiber optic communication system of claim 10:
wherein said butt-coupling means is any combination selected from a plurality of connector pairs, mechanical splices, and fusion splices.

12. Said fiber optic communication system of claim 11:
wherein said output end of said first graded-index multimode fiber is attached to said input end of said singlemode fiber with said connector pair;
said output end of said singlemode fiber is attached to said input end of said second graded-index multimode fiber with said connector pair.

13. Said fiber optic communication system of claim 10:
wherein said light source is a laser diode.

14. Said fiber optic communication system of claim 10:
wherein said light source is a light-emitting diode.

15. Said fiber optic communication system of claim 10:
wherein said light source is a vertical cavity surface-emitting laser diode.

16. A method for inserting a length of a special singlemode fiber between an arbitrary first optical fiber carrying light and a graded-index multimode fiber data transmission medium;
providing said length of said special singlemode fiber whose single bound mode profile matches said fundamental propagation mode of said graded-index multimode fiber;
providing transfer of said light in said arbitrary first optical fiber into said single bound mode of said special singlemode fiber so that only said single bound mode is supported at output end of said singlemode fiber after removal of cladding modes;
eliminating said cladding modes in said special singlemode fiber by a coating on the cladding surface of said special singlemode fiber;
resulting in said light launched exclusively into said fundamental mode of said graded-index multimode fiber.

17. Said method of claim 16;
said arbitrary first optical fiber is an arbitrary singlemode fiber.

18. Said method of claim 16, wherein;
said arbitrary first optical fiber is a multimode fiber.

* * * * *